(12) United States Patent
Bidiville et al.

(10) Patent No.: US 6,788,875 B1
(45) Date of Patent: Sep. 7, 2004

(54) SUSPENSION SYSTEM FOR USE IN AN OPTICAL DISPLACEMENT DETECTION SYSTEM

(75) Inventors: Marc A. Bidiville, Monaco (MC); Antoine Merminod, Gimel (CH)

(73) Assignee: Logitech Europe S.A., Romanel-Sur-Morges (CH)

(*) Notice: Subject to any disclaimer, the term of this patent is extended or adjusted under 35 U.S.C. 154(b) by 0 days.

(21) Appl. No.: 10/119,241

(22) Filed: Apr. 8, 2002

(51) Int. Cl.[7] .............................. G02B 6/00; H01J 40/14
(52) U.S. Cl. ........................................ 385/147; 250/221
(58) Field of Search .............................. 385/12, 14, 52, 385/53, 88, 89, 92–94, 147, 49; 250/221, 235, 239, 566

(56) References Cited

U.S. PATENT DOCUMENTS

| 3,285,548 A | 11/1966 | Malto et al. |
| 3,659,093 A | 4/1972 | Rieth |
| 4,195,330 A | 3/1980 | Savage |
| 4,521,772 A | 6/1985 | Lyon |
| 4,521,773 A | 6/1985 | Lyon |
| 4,794,384 A | 12/1988 | Jackson |
| 4,799,055 A | 1/1989 | Nestler et al. |
| 4,908,743 A | 3/1990 | Miller |
| 5,115,120 A * | 5/1992 | Eastman ................. 235/462.35 |
| 5,264,998 A | 11/1993 | Bax |
| 5,440,468 A | 8/1995 | Savage |
| 3,288,255 A | 11/1996 | Sanchez |
| 5,578,813 A | 11/1996 | Allen et al. |
| 5,644,139 A | 7/1997 | Allen et al. |
| 5,703,353 A | 12/1997 | Blalock et al. |
| 5,709,462 A | 1/1998 | Rumpel |
| 5,729,008 A | 3/1998 | Blalock et al. |
| 5,769,384 A | 6/1998 | Baumgartner et al. |
| 5,786,804 A | 7/1998 | Gordon |
| 5,793,356 A | 8/1998 | Svancarek et al. |
| 5,825,044 A | 10/1998 | Allen et al. |
| 5,994,710 A | 11/1999 | Knee et al. |
| 6,040,950 A | 3/2000 | Broome |
| 6,049,338 A | 4/2000 | Anderson et al. |
| 6,057,540 A | 5/2000 | Gordon et al. |
| 6,104,020 A | 8/2000 | Knee et al. |
| 6,151,015 A | 11/2000 | Badyal et al. |
| 6,175,357 B1 | 1/2001 | Gordon |
| 6,188,057 B1 | 2/2001 | Misek |
| 6,233,368 B1 | 5/2001 | Badyal et al. |
| 6,281,882 B1 | 8/2001 | Gordon et al. |
| 2003/0095374 A1 * | 5/2003 | Richardson ................. 361/681 |

FOREIGN PATENT DOCUMENTS

WO    WO 99/39304    8/1999

OTHER PUBLICATIONS

Bortz, J., Shatz, N., Pitou, D., "Optimal Design of a Nonimaging Projection Lens for Use With an LED Source and a Rectangular Target", Proceedings of SPIE, vol. 4092, 2000.

* cited by examiner

Primary Examiner—David V. Bruce
Assistant Examiner—Thomas R Artman
(74) Attorney, Agent, or Firm—Fenwick & West LLP

(57) ABSTRACT

A system and method of manufacturing directed to an optical device with optical illumination. The optical device has a case for encasing an optical module. The optical module has one or more contact points in contact with the imaged surface. The suspension system uses a flexible connection to suspend the optical module over an opening in the bottom of the case. The flexible connection and the contact points control the distance between a surface and an optical lens within the optical module and allow the optical module to stay in the correct position.

61 Claims, 6 Drawing Sheets

SUSPENSION SYSTEM FOR USE IN AN OPTICAL DISPLACEMENT DETECTION SYSTEM

RELATED APPLICATIONS

The present application relates to the subject matter of U.S. application Ser. No. 10/122,488, filed by Oliver Theytaz, et al. on Apr. 12, 2002.

BACKGROUND

A. Field of the Invention

The present invention relates generally to a suspension system for use with optical technology based displacement detection, and more particularly, to control critical distances along the optical path for use with optical technology in an input device.

B. Description of the Related Art

Optical technology displacement detection is used in many contexts, including in optical input devices for a computer or other device that requires an input device. There are many different types of input devices, including a mouse, a trackball, a digital pen, and a joystick. There are significant advantages to using optical input devices over mechanical and opto-mechanical input devices. For example, mechanical or opto-mechanical input devices have mechanical components that are more susceptible to breakdown, wear out, or clogging. Optical devices having only solid-state components are less susceptible to such breakdown, wear out, or clogging.

Optical input devices use a displacement of an image to detect movement of the input device relative to surface, e.g., a table surface in the case of a mouse or a ball in the case of a trackball. Optical input devices use an imaging lens, a sensor, and a light source to detect movement of the input device. Typically the light source is a light emitting diode (LED). Conventionally, the LED is attached with a clip to a printed circuit board (PCB). The sensor is mounted on the PCB. The sensor is attached to the imaging lens. There are two dimensions that are important to control to ensure the quality of the image. One important distance is the distance between the moving surface, e.g. table or ball, and the lens. The second important distance is the distance between the lens and the sensor. Conventional optical devices do not precisely control the distance between the moving surface and the lens.

Additionally, alignment of the imaging lens, the sensor, and the LED is critical. The alignment has a direct impact on the surface illumination and therefore on image quality. If the distance from the lens to the surface is not correct, oblique lighting creates a shift of the lighted area, which then does not match the area seen by the sensor, resulting in a partially dark image. Good surface illumination and good image quality are essential to an efficient optical system in an input device.

There are several reasons the alignment of the imaging lens, the sensor, and the LED is not always good. In conventional systems, critical optical dimensions are a result of many different parts stacked on top of each other creating an accumulation of errors. A critical optical dimension is a dimension that is critical for the optical system to create a sharp image of the surface, e.g., the table or the ball on the sensor; usually it is the path between the sensor and the surface. In the conventional optical path described above, there are errors introduced as a result of each part, e.g., the bottom of a case for the input device, the PCB, the clip, the LED, the sensor, and the imaging lens. This chain of parts is referred to as a chain of critical dimensions.

Another factor that leads to errors in alignment is that in conventional systems, positioning elements are built on the input device case to reduce the number of parts, cost and assembly time. When manufacturing the case, the highest priority is a cosmetic aspect of the product. Precise dimensions of the case assembly is a lesser priority, however, it can effect the alignment and the dimensions, as described above. Conventional systems use plastic that is chosen for cosmetic appearance and cost, not for mechanical precision. Consequently, the plastic used for the case adds to the chain of critical dimensions and is not a precision part.

Additionally, there are inherent errors introduced by using injected plastic parts. In conventional systems, most of the parts used are made of injected plastic. Injected plastic parts warp over time due to time and variations in temperature. Larger plastic pieces tend to warp more than smaller ones. The bottom of the case of the input device is made from a large piece of injected plastic. It is then a main cause of errors. In some conventional systems, this warping can degrade the performance of the input device or make it stop working completely.

There are several problems with conventional systems. One significant problem with conventional systems is the precise position of the imaging lens relative to the surface. This problem is caused by the chain of dimensions described above. Each part introduces more errors due to the tolerance of the particular connection between any two parts. Another problem is that a small error on the distance to the target can move a lighted spot away from its ideal position.

Another problem of conventional systems is electro static discharges (ESD). Sensitive electronics should be protected from these discharges because they can disturb their function or destroy the components. One conventional solution to the problem of ESD is to increase the distance between internal circuits and the outside world. A conventional solution is to use interleaving structures that make the path of a potential arc of discharge longer. A longer arc is less likely to have a discharge. Thus, there is a higher trigger voltage. The trigger voltage is the voltage difference required to trigger an ESD. To be effective, the trigger voltage should be higher than the specified ESD performance of the product.

Another problem of conventional systems is that conventional input devices are not waterproof. When a device is not waterproof, it can be damaged by spilled drinks or food or moisture entering the device as a result of humid climates.

What is needed is a system and method to precisely position the optical module relative to the imaged surface for use in an optical system that overcomes the above described problems and limitations.

SUMMARY OF THE INVENTION

The present invention provides a suspension system that reduces the number of critical parts. Thus, errors introduced in the chain of critical dimensions are reduced. One embodiment of the present invention provides an optical module that includes a sensor, a lens, a LED, and a LED clip correctly positioned together. Another aspect of the present invention suppresses the effects of the dimension errors in the bottom of the case from the critical dimensions chain. Yet another aspect of the present invention improves ESD immunity by providing a completely sealed structure for the bottom of the case. Finally, one embodiment of the present invention provides a waterproof-type barrier for the case.

One embodiment of the present invention flexibly couples the optical module to the bottom of the case. The bottom of the case can have an opening. The optical module can be positioned above the opening in the case such that the light illuminates a surface and the optical module protrudes through the opening. The surface can be a table or a mouse pad for an optical mouse or a ball for an optical trackball. One embodiment of the present invention uses an articulating arm to flexibly couple the optical module to the bottom of the case. The arm positions the optical module above the opening in the case. Optionally, a spring can also be used to apply a force on the optical module in the direction of the surface such that the optical module is in contact with the surface. Contact points can be part of the optical module and their position relative to the lens is precise because there is only one part in between. Thus, significantly reducing the accumulation of errors affecting the distance between the surface and the lens. When the optical module is in contact with the surface, the image is much sharper. In one embodiment, a flexible membrane can be attached to the bottom of the case over the opening in the case. The membrane is also attached to the optical module and acts to flexibly suspend the optical module over the surface. In one embodiment, the membrane is transparent to the wavelength or wavelengths of light used by the optical module so that light can pass through the membrane without having a hole in the membrane. In another embodiment, a hole can be made in the membrane to allow light to pass through.

Contact points can prevent the optical module from wearing out as a result of friction on the surface. Contact points can be any shape or size and are attached to the optical module or the membrane. The contact points can be made out of a low friction material or a hard material.

The present invention eliminates errors introduced by the bottom of the case because the optical module is flexibly suspended over an opening in the case. Therefore, even if there are imperfections in the bottom of the case or if the surface has irregularities, the imperfections will not alter the position of the optical module and therefore the illumination and the sharpness of the image. The position of the optical module is not dependent on the bottom of the case.

Additionally, a membrane can provide ESD protection. In one embodiment, the entire case can be lined with a membrane. In that embodiment, the case is protected from ESD because the membrane provides a barrier for discharge. Moreover in this embodiment, the membrane also provides a waterproof-type barrier.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE INVENTION

The following description of the present invention is presented in the context of a suspension system for an optical device for use in, for example, a computer input device. In some embodiments, the principles disclosed may be implemented for use in an optical mouse, an optical trackball, an optical joystick, or an optical character recognition device. One skilled in the art will recognize that the present invention may be implemented in many other domains and environments, both within the context of suspension in optical devices, and in other contexts. Different embodiments of the present invention are now described with reference to the figures where like reference numbers indicate identical or functionally similar elements. Also in the figures, the left most digit of each reference number typically corresponds to the figure in which the reference number is first used.

Figure 1:
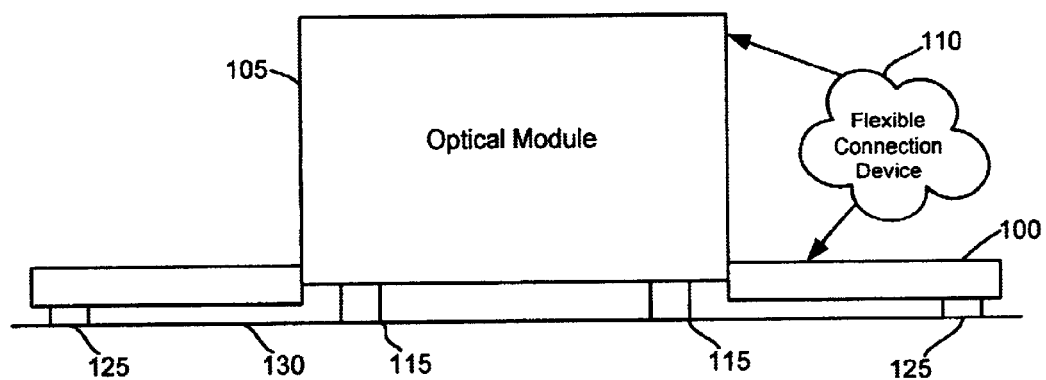
FIG. 1 is a block diagram illustration of an overview of the present invention that includes a flexible suspension system.

Now referring to FIG. 1, there is shown a block diagram of an overview of a suspension system of the present invention for use in a mouse. FIG. 1 shows an optical module 105, a case with an opening 100, a flexible connection device 110, one or more contact points 115, a surface 130, and one or more supporting feet 125. The present invention is used in an optical input device. The principles of the present invention disclosed herein can apply to other optical devices, for example, a trackball, a joystick, or a digital pen.

Figure 2:
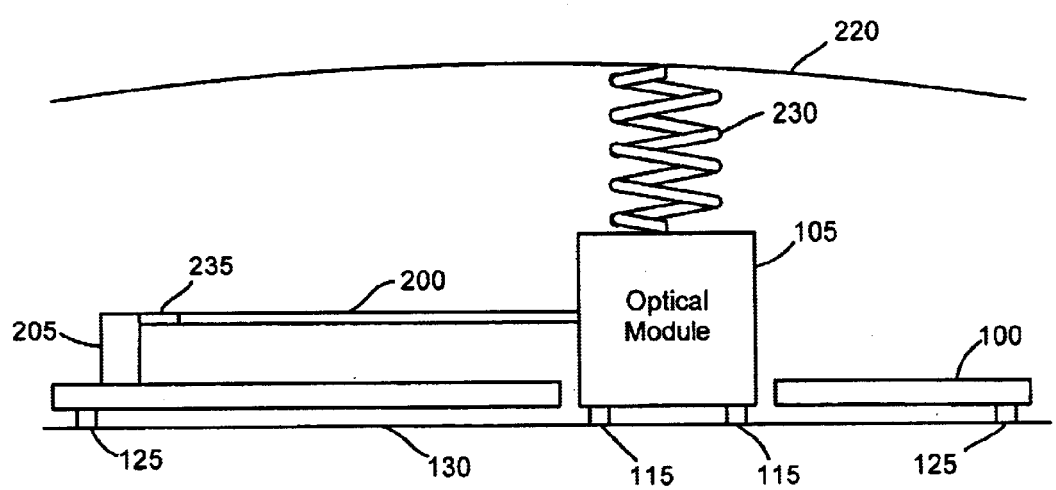
FIG. 2 is an illustration of one embodiment of the present invention that includes a flexible articulating arm, a spring, a mounting module, a contact point, a surface, and feet.
Figure 3:
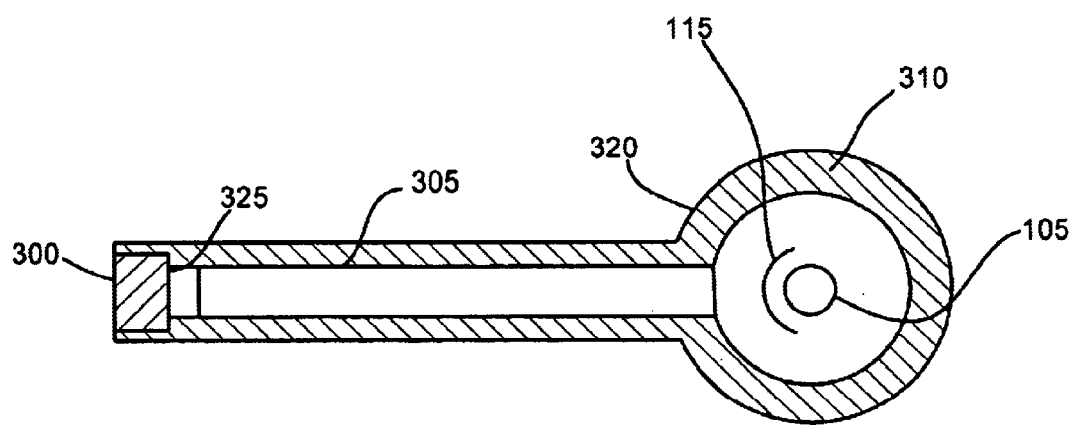
FIG. 3 is an illustration of one embodiment of the present invention that includes a mounting module, a flexible arm, an optical module, and a contact point.
Figure 4:
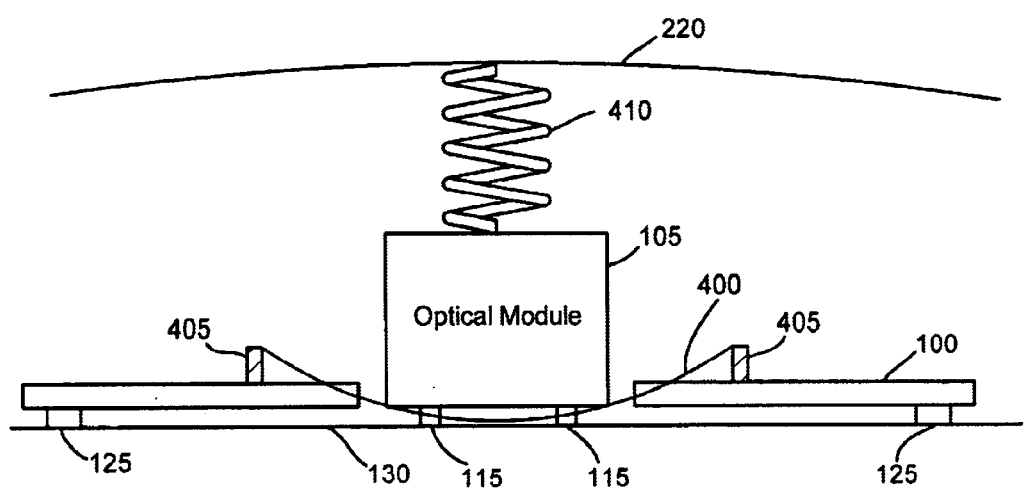
FIG. 4 is an illustration of one embodiment of the present invention that includes a flexible membrane, a mounting module, an optical module, a spring, a contact point, a surface, and feet.

The optical module 105 comprises an optical lens, optical sensor, light source, and a body. The body holds together the components of the optical module. It can also be used to shield the imaging light path from parasitic light or from direct light from the LED. The optical module 105 is flexibly attached to the case housing of the optical input device using flexible connection device 110. In one embodiment, the optical module 105 is spring loaded against the surface, e.g., the table surface for a mouse or a ball surface for a trackball. The flexible connection device 110 can be any device that permits a flexible connection between the optical module 105 and the case 100. Some embodiments of the flexible connection device 110 are shown in FIGS. 2–4 and described below. In one embodiment, the case has an opening 100. The optical module is positioned above and protrudes through the opening in the case such that the light from the optical module illuminates the surface 130. Supporting feet 125 support the bottom of the case 100 on the surface 130. The supporting feet 125 are located on the bottom of the case 100 far from the optical module 105 and contact points 115.

In embodiments with an opening in the case 100, contact points 115 can be used to provide a contact between the surface 130 and the optical module 105. Contact points 115 are points on the optical module that come into contact with the surface. The contact points 115 reduce wear and tear on the optical module that can be caused by friction with the surface. Contact points 115 are shown as individual points however, they can be in any shape. They can be individual points or can be one or more contact surfaces. For example, the contact surface can be in a ring around the optical module or in a "C" shape. Alternatively, contact points forming a triangle can be used. In one embodiment, the contact points 115 are made of a low friction plastic. Some examples of a low friction plastic are TEFLON™ and high molecular weight polyethylene (HMWPE). A thin sheet can be glued on the optical module bottom surface. One example of a thickness of the thin sheet is 0.3 mm. In other embodiments, the contact points 115 are made of a hard material. Some examples of hard material contact points are micro-balls made of zirconia, steel or ruby. In one embodiment, the contact points 115 are located close to an optical axis to minimize errors. An optical axis is typically the axis of symmetry of a light beam, for example from the LED to the target area on the table or from the lighted area through the imaging lens to the sensor.

Now referring to FIG. 2, there is shown one embodiment of the present invention. FIG. 2 shows the case with an opening 100, optical module 105, contact points 115, a spring 230, an articulating arm 200, mounting module 205, a top of the case 220, a hinge or other flexible connector 235, a surface 130, and supporting feet 125. In this embodiment, the articulating arm 200 is the flexible connection device 110. The articulating arm 200 is designed to adjust the position and allow the movement of the optical module 105 in the vertical direction. Typically, the articulating arm is long enough so that the pivot point is a sufficient distance from the optical axis to minimize the azimuth change of the optical module 105 when the arm 200 moves up and down. The articulating arm 200 is attached to the case with a thin flexible section 235 to flex easily. In one embodiment, the bottom of the case 100, the articulating arm 200, and the body of the optical module are a single injected piece with a flexible section on the articulating arm 200. Typically each part is the same material. The material can be Acrylonitrate-Butadiene-Styrene (ABS) or polycarbonate. In another embodiment, the bottom of the case 100 is a piece and the articulating arm 200 and the optical module body are another piece. The articulating arm 200 can be hinged to the bottom of the case 100. The articulating arm 200 and optical module body can be made of a different material, for example, PolyOxyMethylene (POM), DELRIN™, or NYLON™. In another embodiment, the bottom of the case 100 is one piece, the articulating arm 200 and the optical module body are another piece and the arm is rigidly connected to the bottom of the case 100. In this embodiment, the articulating arm 200 includes a flexible portion 235 near the mounting module 205. p The articulating arm 200 is mounted to the case 100 using a mounting device 205. The mounting module 205 can be any attachment mechanism. Some examples of attachment mechanisms are clipping, screwing, gluing, welding, soldering taping, or hinging. In one embodiment, the mounting module 205 is mounting to the bottom of the case 100 such that the articulating arm 200 is inside the case above the bottom of the case 100.

The optical module is described above with reference to FIG. 1. Contact points 115 are used to reduce friction between the optical module 105 and the surface 130. The contact points are described above in reference to FIG. 1. Supporting feet 125 are also described in reference to FIG. 1.

The flexible portion 235 of the arm creates a force that presses the optical module against the table. Optionally, the spring 230 can be used to apply a downward force on the optical module 105. The spring force can maintain the optical module's 105 position against the surface. Spring 230 can be any spring (coil, wire, blade, or any other type of spring) that will permit the appropriate spring force such that the optical module 105 is pressed against the surface. An appropriate spring force is a force such that the input device is not lifted off the surface. Typically, the force of the spring is lower than the weight of the input device. In one embodiment, the spring force is less than half the weight of the optical input device. Spring 230 can be attached to the top of the optical module 105 and also to the top of the case 220. Alternatively, the spring can be inserted between the top of the optical module 105 and the top of the case 220. Any method of attaching the spring 230 to the optical module 105 and the top of the case 220 can be used.

Now referring to FIG. 3, there is shown a bottom view of one embodiment of the present invention. FIG. 3 illustrates the bottom of the case of the optical device including a mounting module 300, flexible articulating arm 305, flexible portion 325, optical module 105, case opening 310, bottom of case 320, and contact points 115. The optical module is described above with reference to FIG. 1.

Articulating arm 305 is similar to articulating arm 200 in dimensions and flexibility. It allows for a flexible connection between the optical module and the case. In one embodiment, the articulating arm 305 can have a flexible portion or hinged connection 325. However, articulating arm 305 is mounting to the bottom of the case 100 such that the articulating arm 305 is in an opening of the case. Shaded area 310 is the opening in the bottom of the case. The opening is shaped such that the optical module 105 can extend through the opening and also articulating arm 305 can be mounting in the opening. Contact points 115 can also be used to provide a contact between the optical module 105 and the surface 130. Mounting module 300 is used to mount articulating arm 305 to the bottom of the case. Mounting module 300 is similar to mounting module 205 except it is located in the opening in the bottom of the case. In one embodiment, the mounting module 300 is a fixed portion of a hinge used to mount the articulating arm 305 to the bottom of the case 100.

Now referring to FIG. 4, there is shown a side view of one embodiment of the present invention. FIG. 4 illustrates optical module 105, the case with an opening 100, top of case 220, spring 410, membrane 400, mounting modules 405, contact points 115, supporting feet 125, and surface 130. The optical module 105, contact points 115, surface 130, and supporting feet 125 are described above with reference to FIG. 1. Membrane 400 is the flexible connection device 110. The membrane 400 can be made of any flexible material. In one embodiment, the membrane 400 is transparent. In another embodiment, a hole is placed in the membrane 400 to allow light to pass through it. The membrane can be a thin sheet of plastic. Some examples of the plastic include a polyester foil, MYLAR™ foil, a polyurethane, and a silicone rubber.

The optical module 105 is attached to the membrane 400 using an attaching method. Some examples of attaching methods are ultrasonic welding, and glue. The membrane can also be pinched between two parts pressed together, for example, between an upper and a lower optical module body. In this embodiment, a hole is required for the attachment mechanism, for example, a pin, a clip, a fitting to mate properly together. The membrane 400 can be attached to the case 100 using mounting modules 405. Mounting modules 405 use an attachment mechanism similar to the mounting modules described in reference to FIGS. 2 and 3 and similar to the attachment mechanism described above for attaching the optical module 105 to the membrane 400. The flexibility of the membrane 400 allows slight vertical displacements of the membrane 400 to adapt to the position of the optical module 105, keeping it in contact with the surface. A part of the membrane can be folded into bellows, allowing larger displacements with lower force required. These folds can be thermoformed into a flat sheet.

Optionally, a spring 410 can be used, attached to the optical module 105 and to the top of the case 220, to provide a force on the optical module 105. In one embodiment, the tension on membrane 400 provides the force on the optical module 105. In one embodiment, contact points 115 (not shown) can also be used to reduce friction and wear and tear of the membrane 400 on the surface.

Additionally, the membrane 400 can provide protection from electrostatic discharge (ESD). Any ESD must travel a longer path around the membrane to the components within the case. The membrane 400 can completely enclose the bottom of the case 100 providing a barrier to electric discharge from the bottom of the mouse. Alternatively, the membrane 400 can be sealed to the bottom of the case 100 increasing the ESD path even more. Thus, protecting the components inside the case from ESD. This increased path length significantly increases the arc trigger voltage and therefore provides protection against ESD by raising it above what can normally happen in office environment. In one embodiment, no hole is made in the membrane. In that embodiment, the membrane is made out of a transparent material.

Additionally, the entire case can be lined with a similar membrane. Thus, again the device is protected from ESD. Also, lining the entire case with a membrane can provide a waterproof-type barrier for the case. The membrane can be thermo formed. Thermo forming allows easily deformed zones to permit small movements or position adjustments.

Figure 5A:
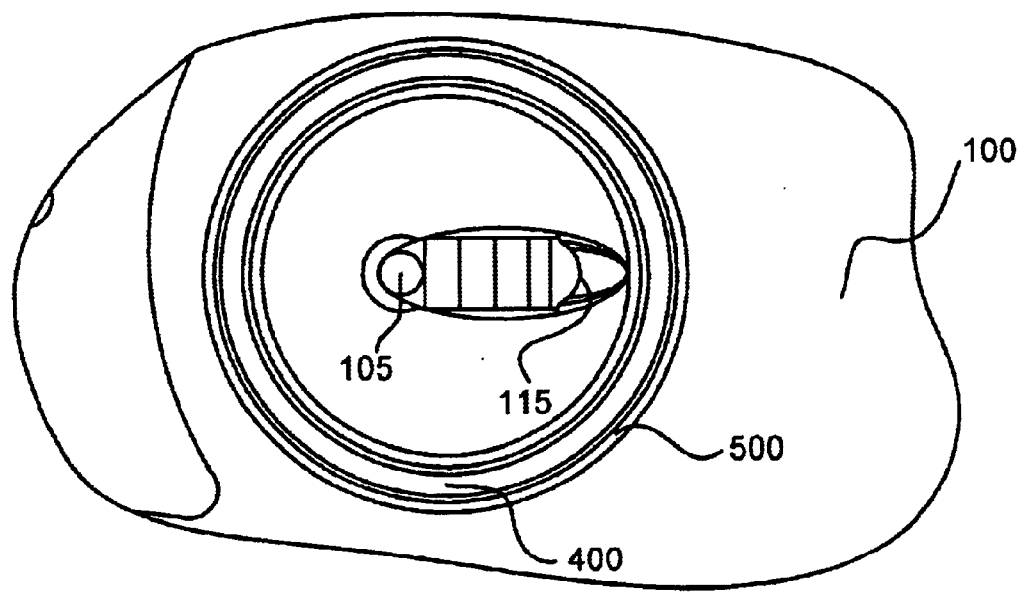
FIG. 5A is an illustration of a bottom view of one embodiment of the present invention that includes a bottom of the case, a flexible membrane, an optical module, and a contact point.

Now referring to FIG. 5A, there is shown a bottom view of one embodiment of the present invention. FIG. 5A illustrates the bottom of the case 100, membrane 400, contact points 115, and the folds in the membrane 500. The membrane is pinched between a lens and a friction ring. In one embodiment, the membrane is pinched ultrasonic welding. The membrane can be attached to the case bottom ultrasonic welding. The friction ring can be an injected part made of low friction material or including receptacles for three hard material micro spheres (not shown). FIG. 5A shows an alternate view of the embodiment shown in FIG. 4. In this view, the folds in the membrane 500 can be seen as concentric circles.

Figure 5B:
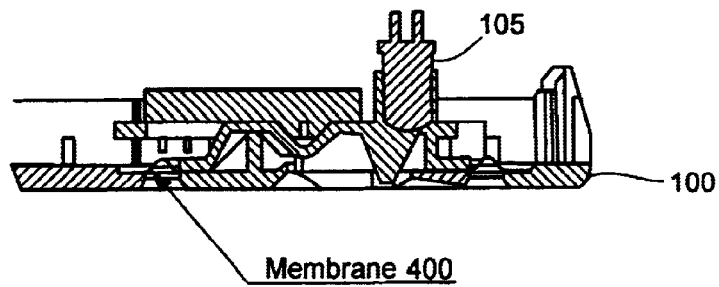
FIG. 5B is an illustration of a side view of one embodiment of the present invention that includes a bottom of the case, a flexible membrane, an optical module and a contact point.

Another embodiment similar to FIG. 4 is shown in FIG. 5B. FIG. 5B is a side view of an embodiment of the present invention illustrating the bottom of the case 100, a part of the optical module 105 (the LED), and the membrane 400. Similarly to FIG. 5A, the folds in the membrane 400 can be seen in FIG. 5B.

Figure 5C:
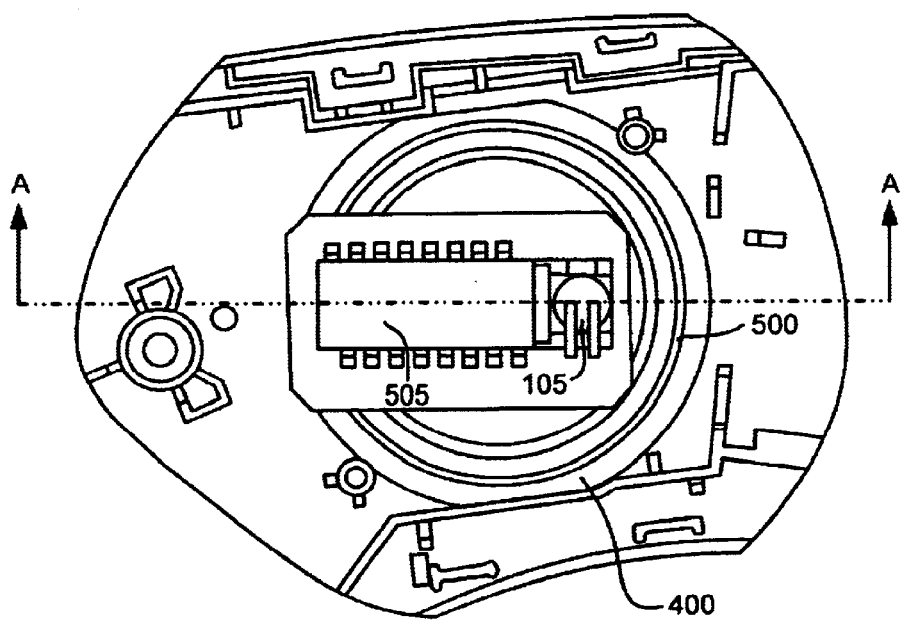
FIG. 5C is an illustration of a top view of one embodiment of the present invention that includes a flexible membrane, an optical module, a sensor chip, and a contact point.

A top view of an embodiment of the present invention is shown in FIG. 5C. FIG. 5C shows a sensor chip 505, a part of the optical module 105 (the LED), the membrane 400. The folds in the membrane 400 can be seen in FIG. 5C as concentric circles 500.

From the above description, it will be apparent that the invention disclosed herein provides a novel and advantageous system for maintaining a constant distance between the surface and the lens in an optical device. The foregoing discussion discloses and describes merely exemplary methods and embodiments of the present invention. As will be understood by those familiar with the art, the invention may be embodied in other specific forms without departing from the spirit or essential characteristics thereof. For example, the invention may be applied to other domains and environments, and may be employed in connection with additional applications where precise location of or distance from a sensor is desirable using inexpensive components.

Accordingly, the following description, while intended to be illustrative of a particular implementation, is not intended to limit the scope of the present invention or its applicability to other domains and environments. Rather, the scope of the present invention is limited and defined solely by the claims.

We claim:

1. A suspension system for use in an optical input device, the suspension system comprising:

an optical module for detecting displacement of the optical input device;

a contact point coupled to the optical module for providing a contact between the optical module and a surface;

a case for housing the optical module, including an opening in a bottom portion of the case; and a flexible connection coupled to the optical module and the case for suspending the optical module within the case over the opening in the bottom portion of the case and the optical module protruding from the opening in the bottom portion of the case.

2. The suspension system of claim 1, wherein the flexible connection further comprises a flexible articulating arm.

3. The suspension system of claim 2, wherein an arm pivot point is a sufficient distance away from the optical axis to minimize an azimuth change of the optical module in response to a horizontal movement of the flexible articulating arm.

4. The suspension system of claim 2, further comprising a mounting module for coupling the flexible articulating arm to the bottom of the case.

5. The suspension system of claim 1, wherein the flexible connection comprises a flexible membrane.

6. The suspension system of claim 5, wherein the flexible membrane comprises a seal of the opening in the bottom of the case.

7. The suspension system of claim 5, wherein the flexible membrane provides insulation and electrostatic discharge protection.

8. The suspension system of claim 7, wherein the flexible membrane comprises a transparent material configured to pass through light from the optical module.

9. The suspension system of claim 1, wherein the optical input device comprises a mouse.

10. The suspension system of claim 1, wherein the optical input device comprises a trackball.

11. The suspension system of claim 1, wherein the optical input device comprises a joystick.

12. The suspension system of claim 1, wherein the optical input device comprises a digital pen.

13. The suspension system of claim 1, further comprising a spring coupled to a top of the case and the optical module for providing a force on the optical module.

14. The suspension system of claim 1, wherein the contact point comprises a low friction plastic.

15. The suspension system of claim 14, wherein the low friction plastic comprises a high molecular weight polyethylene material.

16. The suspension system of claim 1, wherein the contact point comprises a hard material.

17. The suspension system of claim 16, wherein the hard material comprises a ruby material.

18. The suspension system of claim 16, wherein the hard material comprises a zirconia material.

19. The suspension system of claim 16, wherein the hard material comprises a steel material.

20. The suspension system of claim 1, wherein the contact point comprises a single point.

21. The suspension system of claim 1, wherein the contact point comprises a "C" shape on the optical module.

22. The suspension system of claim 1, wherein the contact point comprises a plurality of points that form a triangle shape on the optical module.

23. A suspension device for use in an optical input device comprising:
 a housing with an opening in a bottom of the housing;
 an optical module coupled to the housing;
 a contact point coupled to the optical module for providing a contact between the optical module and a surface;
 a flexible membrane for coupling the optical module to the housing by supporting the optical module over the opening in the bottom of the housing; and
 a resilient member coupled to the housing and the optical module for providing a force on the optical module.

24. The suspension device of claim 23, wherein a welding couples the flexible membrane to the housing.

25. The suspension device of claim 23, wherein a glue couples the flexible membrane to the housing.

26. The suspension device of claim 23, wherein the flexible membrane comprises a transparent material.

27. The suspension device of claim 23, wherein the flexible membrane provides electrostatic discharge protection.

28. The suspension device of claim 23, wherein the flexible membrane provides a waterproof-type barrier for the case.

29. The suspension device of claim 23, wherein the optical input device comprises a mouse.

30. The suspension device of claim 23, wherein the optical input device comprises a trackball.

31. The suspension device of claim 23, wherein the optical input device comprises a joystick.

32. The suspension device of claim 23, wherein the optical input device comprises a digital pen.

33. The suspension device of claim 23, wherein the resilient member comprises a spring.

34. The suspension device of claim 33, wherein the spring is coupled along a top portion of an interior of the housing.

35. A suspension system for use in an optical input device comprising:
 an optical means for detecting movement using an optical component;
 a contact means for providing a contact between the optical means and a surface;
 a housing means for housing the optical means with an opening in a bottom of the housing means;
 a connection means for flexibly coupling the optical means to the housing means.

36. The suspension system of claim 35, wherein the connection means comprises a flexible membrane for suspending the optical module over the opening in the bottom of the housing means.

37. The suspension system of claim 36, wherein the flexible membrane comprises a transparent material.

38. The suspension system of claim 36, wherein the flexible membrane is attached to the housing means.

39. The suspension system of claim 36, wherein the flexible membrane seals the opening in the bottom of the case.

40. The suspension system of claim 36, wherein the flexible membrane provides electrostatic discharge protection.

41. The suspension system of claim 35, further comprising a spring means for providing a force on the optical means, the spring means coupled to a top of the housing means and the optical means.

42. The suspension system of claim 35, wherein the optical input device comprises a mouse.

43. The suspension system of claim 35, wherein the optical input device comprises a trackball.

44. The suspension system of claim 35, wherein the optical input device comprises a joystick.

45. The suspension system of claim 35, wherein the optical input device comprises a digital pen.

46. A method of manufacturing a suspension system for use in an optical input device comprising:
 constructing an optical module comprising at least one optical component and at least one contact point;
 enclosing the optical module with a case having a bottom portion and a top portion;
 inserting an opening in the bottom portion of the case;
 suspending the optical module over the opening in the bottom of the case by flexibly coupling the optical module to the case; and
 connecting a resilient member to the case and the optical module to apply a force on the optical module.

47. The method of manufacturing of claim 46, wherein the step of suspending comprises mounting a flexible membrane to the bottom portion of the case.

48. The method of manufacturing of claim 47, wherein the flexible membrane provides protection from electrostatic discharge.

49. The method of manufacturing of claim 47, wherein the flexible membrane provides a waterproof-type barrier.

50. The method of manufacturing of claim 46, wherein the step of suspending comprises coupling a flexible articulating arm to the bottom portion of the case.

51. The method of manufacturing the suspension system of claim 46, wherein the resilient member comprises a spring.

52. The method of manufacturing the suspension system of claim 51, wherein the step of connecting further comprises connection the spring with the top portion of the case.

53. An electrostatic discharge protection system comprising:
 an optical module;
 a case for housing the optical module, the case including an opening for exposing at least a portion of the optical module; and
 a membrane mounted to the case and coupled with the optical module configured to provide a path for electrostatic discharge.

54. The system of claim 53, wherein the membrane completely surrounds the optical module.

55. The system of claim 53, wherein the membrane provides a waterproof-type barrier of the case.

56. The electrostatic discharge protection system of claim 53, wherein the case comprises a housing for one from a group consisting of a computer mouse, a joystick, a trackball, and a digital pen.

57. A waterproof-type barrier system for use in an optical input device comprising:

an optical module configured to provide displacement information;

a case for housing the optical module, the case including an opening for exposing at least a portion of the optical module; and a membrane mounted to the case and coupled to a perimeter of the optical module, the membrane configured to provide a waterproof-type barrier for the optical input device.

58. The waterproof-type barrier system of claim 57, wherein the case comprises a housing for one from a group consisting of a computer mouse, a joystick, a trackball, and a digital pen.

59. A suspension device for use in an optical input device comprising:

a housing with an opening in a bottom of the housing;

an optical module coupled to the housing;

a contact point coupled to the optical module for providing a contact between the optical module and a surface;

a flexible membrane for coupling the optical module to the housing by supporting the optical module over the opening in the bottom of the housing, the flexible membrane comprising a moisture barrier.

60. The suspension device of claim 59, wherein the flexible membrane comprises a transparent material.

61. A method of manufacturing a suspension system for use in an optical input device comprising:

constructing an optical module comprising at least one optical component and at least one contact point;

enclosing the optical module with a case having a bottom portion and a top portion;

inserting an opening in the bottom portion of the case; and suspending the optical module over the opening in the bottom of the case by flexibly coupling the optical module to the case with a flexible membrane, the flexible membrane providing a moisture barrier.

* * * * *